United States Patent [19]

Sharps

[11] 4,453,867
[45] Jun. 12, 1984

[54] DISC STIRRER

[75] Inventor: David L. Sharps, Martinsville, Va.

[73] Assignee: E. I. Du Pont de Nemours and Company, Wilmington, Del.

[21] Appl. No.: 406,555

[22] Filed: Aug. 9, 1982

[51] Int. Cl.³ .......................... B01F 7/16; B01F 7/26; B29B 1/06
[52] U.S. Cl. .................................. 366/98; 366/147; 366/148; 366/317; 432/209; 432/210
[58] Field of Search ................. 126/343.5 R, 343.5 A; 219/421, 422; 264/25, 85; 425/143, 382.2, 200, 203; 432/209, 210; 366/76, 96–98, 144, 145, 146, 148, 184, 190, 194, 195, 292, 293, 295, 147, 315–317, 325, 329

[56] References Cited

U.S. PATENT DOCUMENTS

| | | | |
|---|---|---|---|
| 3,529,936 | 9/1970 | Muller-Rid et al. | 366/317 X |
| 3,603,563 | 9/1971 | Holland | 366/317 |
| 4,010,934 | 3/1977 | McCord et al. | 366/316 X |
| 4,259,021 | 3/1981 | Goudy, Jr. | 366/146 X |

*Primary Examiner*—Timothy F. Simone

[57] ABSTRACT

A solid circular plate mounted above the existing stirrer in a melt grid spinning apparatus provides a positive hold-up time for melting flake descending from the melt grid to the melt pump beneath the grid.

3 Claims, 3 Drawing Figures

DISC STIRRER

BACKGROUND OF THE INVENTION

This invention relates to melt spinning of particulate polymeric material and more particularly it relates to apparatus for providing a positive hold-up time for the melting material descending from the melt grid to the melt pump beneath the grid.

In the process for producing filaments and fibers from polymeric material as described by Pierce in U.S. Pat. No. 2,683,073, polymer is melted in a melting unit and then flows into a reservoir where it is mixed by a driven stirrer. A pump meters a supply of molten polymer from the reservoir to the spinning orifices. Flores has described in U.S. Pat. No. 2,916,262 construction and use of a heated grid for melting the polymer which comprises a double-walled jacket of rectangular plan having a plurality of hollow fin-like elements oriented on longitudinal axes substantially parallel to one another. Heating fluid circulates through the jacket and the fins. When using the Flores grid to provide molten polymer for spinning, polymer flakes are charged into the grid to be melted. During the melting operation it is found that some of the flake is not completely melted. The existence of such unmelted flake creates a problem of spherulite seeding in the extruded fiber. Higher grid unit temperatures have been employed as one solution to the problem to seek complete flake melting to reduce the spherulite problem.

SUMMARY OF THE INVENTION

The difficulties described above are obviated without the need for higher grid unit temperatures in accordance with this invention by providing a circular plate mounted above the existing stirrer and beneath the melting grid. This provides positive hold up time for the descending melting flake and favors complete melting of the flake to a melt of uniform temperature. Opposed curved upstanding ribs attached to the upper surface of the plate facilitate the movement of molten polymer across the upper surface of the plate and over its edge. A pair of vanes are attached to the lower surface of the plate in opposite quadrants near its peripheral edge. Relief holes are also provided at a central location on the plate.

DETAILED DESCRIPTION OF THE ILLUSTRATED EMBODIMENTS

Figure 1:
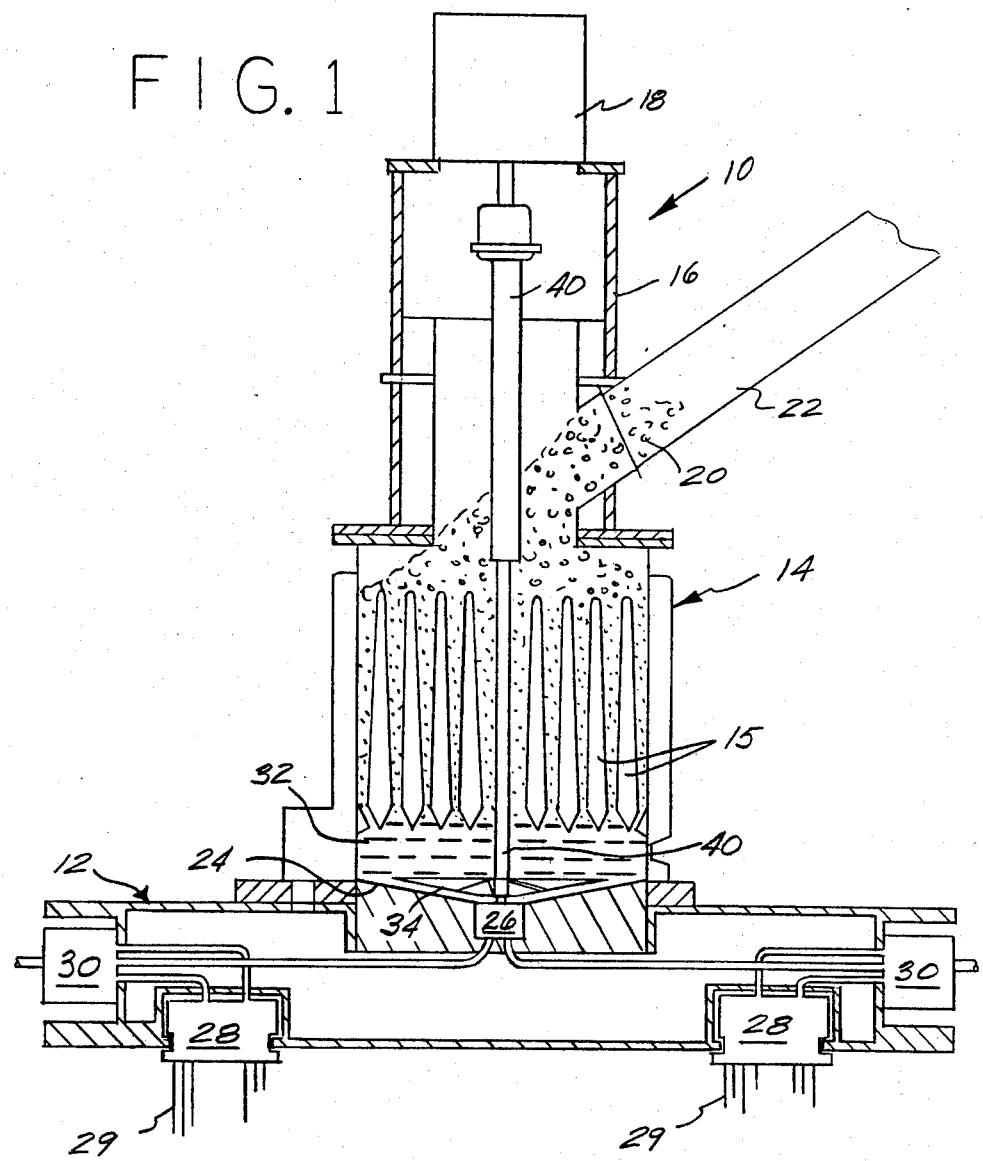
FIG. 1 is a vertical cross section of a melt spinning apparatus.
Figure 2:
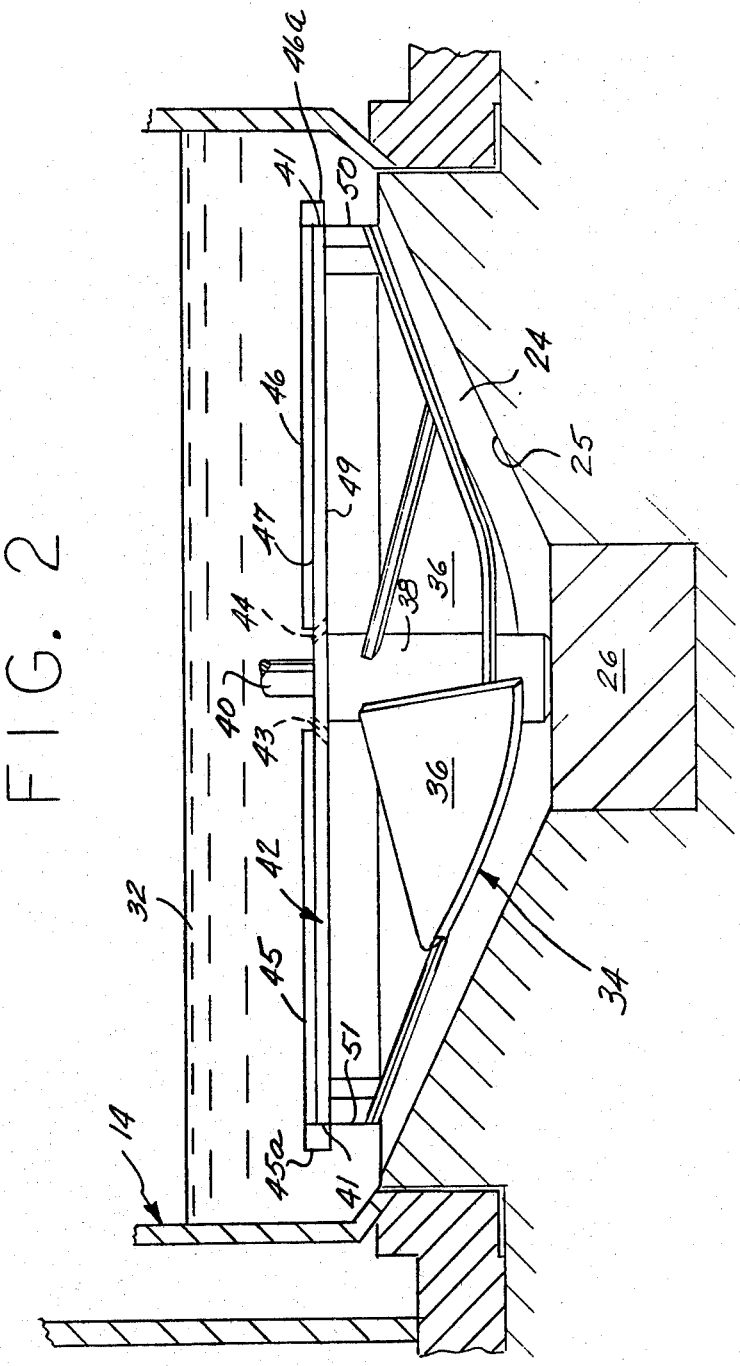
FIG. 2 is an enlarged elevation of the plate stirrer of this invention.
Figure 3:
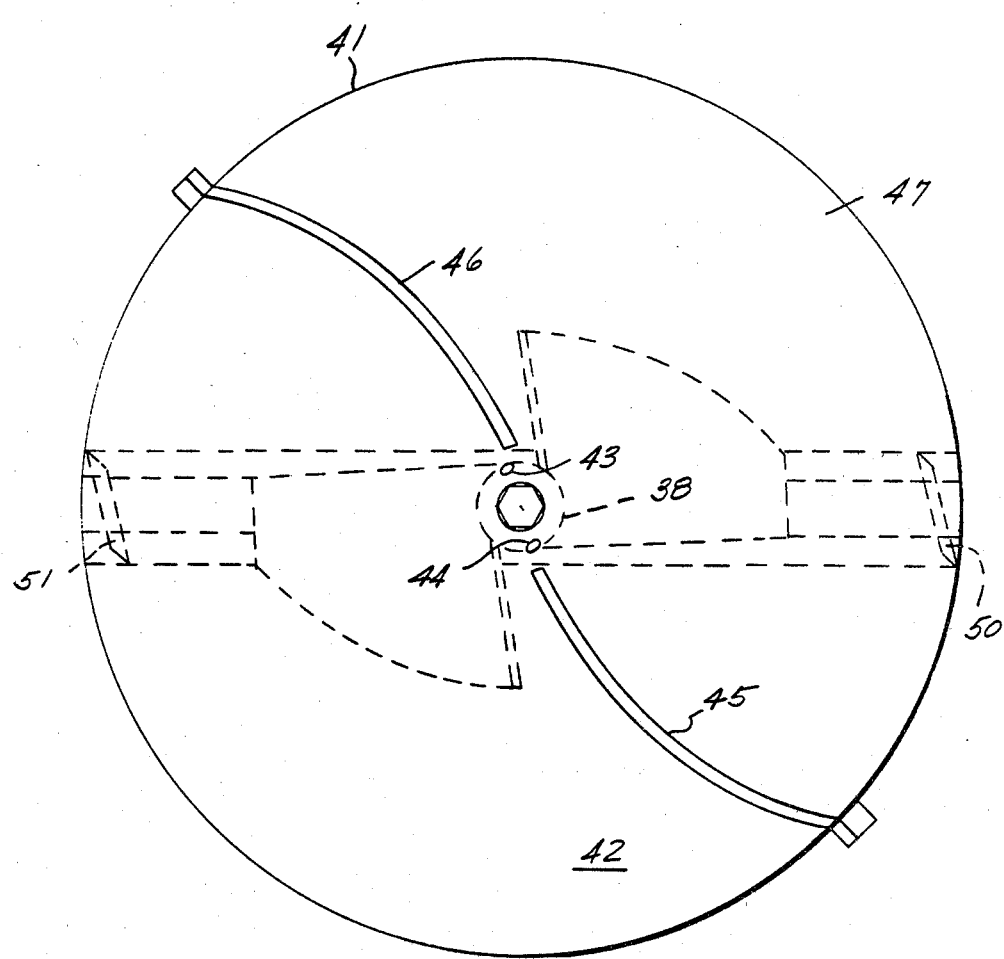
FIG. 3 is a plan view of FIG. 2.

Referring to FIG. 1 the melt spinning apparatus chosen for purposes of illustration is generally designated 10 and includes a heated pump block 12 supporting melting grid 14 (including heated fins 15) which in turn supports motor stand 16 on which is mounted motor 18. A supply of solid flakes of polymer 20 are fed to melting grid 14 via supply chute 22 in communication with the grid. Located in pump block 12 is a collection chamber 24 which forms a reservoir for molten polymer and has a melt pump 26 mounted therein to supply molten polymer to the meter pumps 30 then to spinning packs 28 where it is extruded as filaments 29.

The molten polymer collects as a pool 32 in collection chamber 24. In order to stir this pool of molten polymer a stirrer 34 is provided having a plurality of blades 36 which are shaped to the contour of the interior wall 25 of the collection chamber 24. The blades 36 are attached to a hub 38 which is secured to a drive shaft 40. The bottom of the hub engages and drives melt pump 26. The upper end of drive shaft 40 passes through the grid to electric motor 18 which drives the stirrer and melt pump. A circular plate 42 having upper and lower surfaces 47, 49 respectively, and a peripheral edge 41 is mounted above blades 36 on hub 38. The diameter of the plate is less than the diameter of the collecting chamber 24. The plate has two approximately 3/32" diameter holes 43, 44 located near its center which serve as relief holes to release air that may be trapped under the plate at startup and feed polymer from the bottom to the top of the plate during operation. Attached to the top of the plate 42 are opposed upstanding curved ribs 45, 46 which extend in opposite quadrants from the center of the plate to its peripheral edge 41. The ribs have ends 46a and 45a which extend over the edge 41 of the plate 42 to direct molten polymer traveling across the plate downward into the melt pool 32. A pair of vanes 50, 51 are attached to the lower surface of the plate near its peripheral edge 41 in opposite quadrants of the plate. The vanes serve to move polymer under the plate 42.

In a series of runs using a 9 inch diameter plate stirrer in a 10 inch diameter collection chamber described above, spherulite seeding in the extruded filaments is reduced and operation was permitted at lower grid unit temperatures which has improved fiber luster via reduced degradation.

I claim:

1. In an apparatus for melting particulate polymeric material including a melting grid, a collecting chamber for the molten polymer placed beneath the grid and a stirrer consisting of a driven central shaft coaxial with the collecting chamber and of a plurality of blades extending from the shaft and shaped to sweep the contour of the chamber, the improvement comprising: a circular plate having upper and lower surfaces and a peripheral edge mounted above the blades on said shaft perpendicular thereto, said plate having a diameter less than the diameter of the collecting chamber; a pair of vanes attached to the lower surface of the plate in opposite quadrants of the plate near its peripheral edge; and a pair of opposed curved ribs attached to the upper surface of said plate, each rib having an end extending below the peripheral edge of said plate.

2. The apparatus as defined in claim 1, said collecting chamber having an inverted frusto-conical configuration, said plate having a diameter less than the upper diameter of the chamber.

3. The apparatus as defined in claims 1 or 2, said plate having a plurality of relief holes centrally located connecting the upper and lower surfaces of the plate.

* * * * *